United States Patent
Copeland et al.

(10) Patent No.: US 11,554,797 B2
(45) Date of Patent: Jan. 17, 2023

(54) HANDHELD SOLENOID ACTIVATION REMOTE FOR A RAILROAD CAR DOOR

(71) Applicant: JAC Operations, Inc., Chicago, IL (US)

(72) Inventors: Cory Copeland, Tuscumbia, AL (US); Gregory P. Josephson, Salix, PA (US)

(73) Assignee: JAC OPERATIONS, INC, Chicago, IL (US)

( * ) Notice: Subject to any disclaimer, the term of this patent is extended or adjusted under 35 U.S.C. 154(b) by 946 days.

(21) Appl. No.: 16/386,168

(22) Filed: Apr. 16, 2019

(65) Prior Publication Data

US 2019/0315377 A1  Oct. 17, 2019

Related U.S. Application Data

(60) Provisional application No. 62/658,527, filed on Apr. 16, 2018.

(51) Int. Cl.
*B61D 7/02* (2006.01)
*G08C 19/02* (2006.01)
*H02J 7/00* (2006.01)

(52) U.S. Cl.
CPC .............. *B61D 7/02* (2013.01); *G08C 19/02* (2013.01); *H02J 7/0045* (2013.01)

(58) Field of Classification Search
CPC ... B61D 7/02; B61D 7/24; B61D 7/26; B61D 7/30; G08C 19/02; H02J 7/0045
See application file for complete search history.

(56) References Cited

U.S. PATENT DOCUMENTS

| | | | | |
|---|---|---|---|---|
| 4,004,475 A | * | 1/1977 | Pase | B25B 21/002 81/57.3 |
| 4,629,386 A | * | 12/1986 | Tullos | B61D 7/30 414/572 |
| 5,311,822 A | * | 5/1994 | Bounds | E01B 27/022 105/283 |
| 8,342,105 B2 | * | 1/2013 | Selapack | B61D 7/00 105/287 |
| 9,120,492 B2 | * | 9/2015 | Fry | B61D 7/28 |
| 2009/0078151 A1 | * | 3/2009 | Galvan | B61D 7/18 105/311.1 |

* cited by examiner

Primary Examiner — Robert J McGarry, Jr.
(74) Attorney, Agent, or Firm — Blynn L. Shideler; Krisanne Shideler; BLK Law Group

(57) ABSTRACT

A handheld portable solenoid activation device for operating doors of hopper railcars includes a battery power source and is configured for safe single hand operation in either opening or closing arrangements, recharging of the batteries, and isolation of the electrical components from the operator. The device or remote includes a housing configured to be held in one hand of the user; a battery power source within the housing; a pair of leads extending from the housing and selectively coupled to the battery power source and configured to align and connect with the touch plate and ground plate of a railroad car door operating solenoid; and an activator configured for one handed operation by the user, wherein activation when the leads are connecting the touch plate and ground plate will activate the solenoid for opening or closing of the railroad car door.

18 Claims, 1 Drawing Sheet

US 11,554,797 B2

HANDHELD SOLENOID ACTIVATION REMOTE FOR A RAILROAD CAR DOOR

RELATED APPLICATIONS

This application claims the benefit of U.S. provisional patent application Ser. No. 62/658,257 titled "Solenoid Activation Remote for Railroad Car Door" which is incorporated herein by reference.

BACKGROUND OF THE INVENTION

1. Field of the Invention

The present invention relates to railcars and to operator controlled door operating mechanism for railcars.

2. Background Information

Railroad hopper cars typically have discharge doors or gates at the bottom thereof for discharging laden. The doors are often operated by activation of a solenoid valve using a remote power source. This is often accomplished by a wayside activation member located at designated discharge sites. The wayside activation member may be automatic or may be controlled by an operator standing wayside.

Additionally, there are times when the doors require operation when the car is not at a designated discharge site, such as when the car is taken in for maintenance and repairs. Currently one common method is to use a set of exposed disposable batteries wired together to achieve the requisite voltage and have separate hands each holding a lead that is used to activate the solenoid valve. This method is cumbersome and impractical.

It would be beneficial to have a portable mechanism for an operator to selectively activate solenoid valves of railroad car doors

SUMMARY OF THE INVENTION

It is an object of the present invention to provide an effective and efficient handheld portable solenoid activation device for operating doors of hopper railcars including a battery power source and which is configured for safe single hand operation in either opening or closing arrangements, recharging of the battery power source, and isolation of the electrical components from the operator.

The object of the invention may be described as providing a handheld solenoid activation device or remote for a railroad car door comprising a housing configured to be held in one hand of the user; a battery power source within the housing; a pair of leads extending from the housing and selectively coupled to the battery power source and configured to align and connect with the touch plate and ground plate of a railroad car door operating solenoid; and an activator configured for one handed operation by the user, wherein activation when the leads are connecting the touch plate and ground plate will activate the solenoid for opening or closing of the railroad car door.

These and other advantages of the present invention will be clarified in the brief description of the preferred embodiment.

DESCRIPTION OF THE PREFERRED EMBODIMENTS

Figure 1:
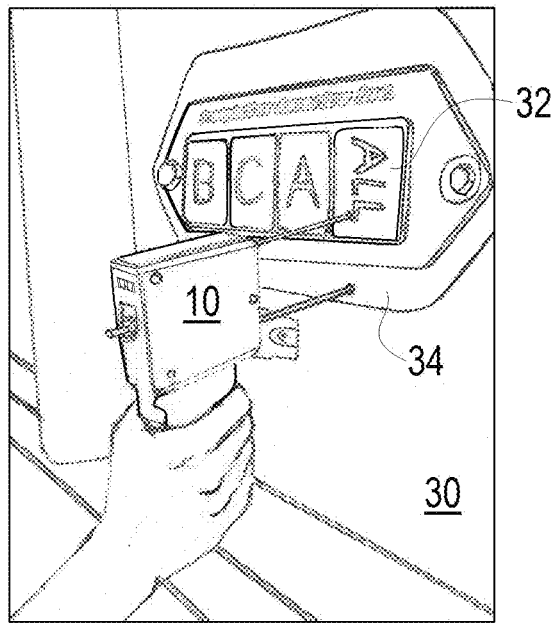
FIG. 1 is a perspective view of a handheld solenoid activation remote for railroad car door according to one embodiment of the present invention coupled to the touch plate and ground plate of a railroad car door operating solenoid.
Figure 2:
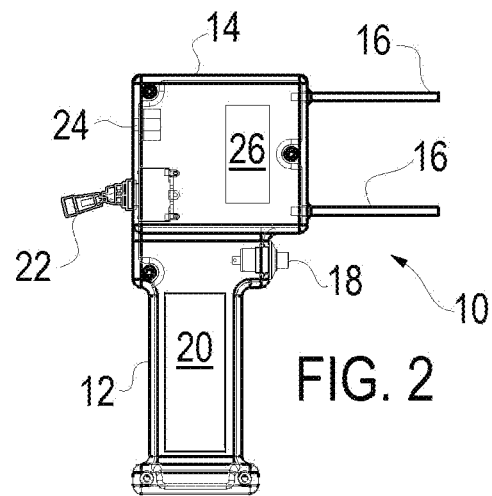
FIG. 2 is a schematic side elevation view of the handheld solenoid activation remote of FIG. 1 with the housing transparent and the wiring omitted for clarity.
Figure 3:
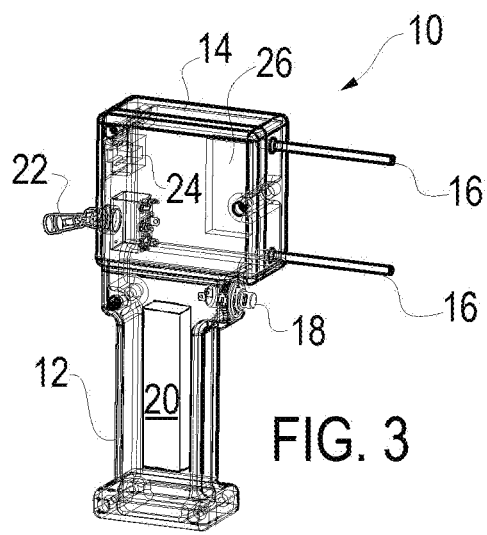
FIG. 3 is a schematic perspective view of the handheld solenoid activation remote of FIG. 1 with the housing transparent and the wiring omitted for clarity.

The invention provides a handheld solenoid activation device or remote 10 for a railroad car door shown in FIGS. 1-3. As described below the invention yields an effective and efficient handheld portable solenoid activation device 10 for operating doors of hopper railcars 30 including a housing (collectively 12, 14) with a battery power source 20 and which is configured for safe single hand operation, as the remote 10 weighs about 1 lbs and easily used and switched between either opening or closing arrangements. The remote 10 provides for easy recharging of the battery power source 20, and for isolation of the electrical components from the operator.

The housing is formed of a lower pistol grip portion 12 housing the battery power source 20 and activator 18 that is convenient for one handed holding and remote 10 operation, and an upper portion 14 housing the leads 16, polarity toggle 22, recharging port 24 and control board or controller 26 (the internal components are only shown in schematic fashion with the wiring eliminated for clarity, but will be easily understood by those in the art.). The housing 12 and 14 can be easily formed as a single plastic unit that is rubberized on the exterior for isolation of the electrical components from the operator. The housing 12 and 14 may be effectively formed by 3D printing methods, although any conventional forming methods and materials may be used provided the housing 12 and 14 is easily held in one hand by the operator and provides insulation of the components to the operator.

The leads 16 are rigid leads such as formed by metal rods, specifically ¼" diameter aluminum rods. The leads 16 extend from the upper housing 14 and internally coupled to the battery power source 20 via the controller 26. The leads 16 are spaced and configured to align and connect with the touch plate 32 and ground plate 34 of a railroad car door operating solenoid of railcar 30. The touch plate 32 is shown for a VERSAFLOOD II™ brand railcar 30 but the remote 10 can be designed for any desired car system having the touch plate 32 and ground plate 34 for operation of a railroad car door operating solenoid. The touch plate 32 is shown for a VERSAFLOOD II™ brand railcar 30 has three doors A, B and C that can be operated individually or all at once by utilizing the desired touch plate 32.

The activator 18 is in the form of a trigger button and is configured for one handed operation by the user. Pressing the button or trigger forming activator 18, when the leads 16 are connecting the touch plate 32 and ground plate 34 will activate the solenoid for opening or closing of the railroad car door of car 30. The activator 18 is coupled to the controller 26 and will essentially complete the circuit when pressed (assuming the toggle switch 22 is in the open or closed position discussed below) to provide power to the leads 16 from the battery power source 20.

Alternative activators 18 are contemplated within the scope of the present invention. For example, in an alternative arrangement the activator 18 could be formed by a spring biased connection of the leads 16 wherein the leads 16 are spring biased away from electrical contact and pressing the leads 16 against the touch plate 32 and ground plate 34 completes the circuit. A further example would be forming the activator 18 as a spring biased insulation sleeve over the leads 16 wherein pressing the covering sleeves against the touch plate 32 and ground plate 34 allows the insulation sleeves to be moved back until the leads 16 contact the touch plate 32 and ground plate 34 to complete the circuit. The trigger switch shown has the advantage of being easy to operate and immediately understood by operators and is preferred.

The battery power source 20 can be any number of rechargeable batteries that yield the power sufficient to activate a solenoid of a railroad car door. A 24 volt supply and 3800 mAh is sufficient. Generally the rechargeable battery packs found in commercial hand held battery drills and tools are sufficient to form the battery power source 20.

The polarity toggle switch 22 (or just toggle) is coupled to the controller 26 and can be switched between an upper position in which the top lead 16 is positive and the bottom lead 16 is negative; and a bottom position in which the polarity of the remote 10 is switched and the top lead 16 is negative and the bottom lead 16 is positive; and an off position in which no power is sent to the leads 16 (even with the depression of the activator trigger 18. It will be understood by those in the art that with the toggle 22 in the top or bottom position the remote 10 can be used to selectively open or close the doors of the railcar 30.

Alternative toggles are also possible such as a pivot plate supporting the leads 16 such that they can be rotated 180 degrees to swap places and effectively change the polarity of the device (and include a midpoint neutral or off position in which no charge is sent to the leads 16). Similarly the pistol grip housing 12 could be made to pivot 180 degrees (or some other amount) to alter the coupling of the batter power source 20 to affect a polarity switch. The pivoted lower housing embodiment could also have an off position in which the battery power source 20 is not coupled to the remaining system. These alternatives are more complex than the easily implemented and understood toggle switch shown.

Figure 4:
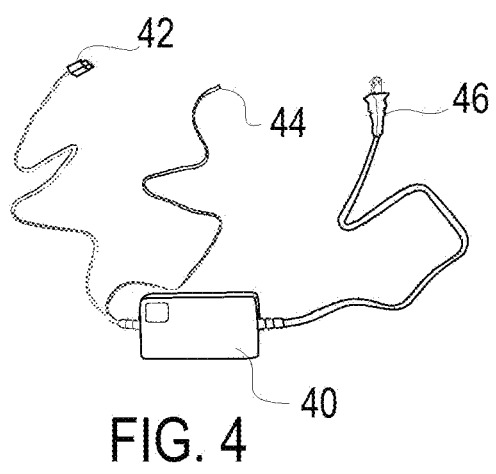
FIG. 4 is a schematic plan view of a battery charging unit for the battery power source of the handheld solenoid activation remote of FIG. 1.

The remote 10 includes a charging port 24 in the upper housing 14 is easily formed as a female Tamiya connector that receives a male charging plug 42 of power charger 40 that can be plugged into a conventional power outlet with plug 46 for recharging the rechargeable power source 20. The power charger 40 shown separately in FIG. 4 includes a temperature sensor 44 for safety considerations.

In operation the toggle switch 22 is switched from off to the desired polarity (up or down) and the leads 16 aligned with and contacted with the touch plate 32 and ground plate 34 of the railcar and the button of the activator 18 is pressed to power the leads 16 and activate the solenoid for selective opening or closing (depending upon the selected polarity) of the railroad car door of car 30. When not in use the toggle 22 can be placed in the off position such that now power will go to the leads even if the activator 18 is pressed.

Although the present invention has been described with particularity herein, the scope of the present invention is not limited to the specific embodiment disclosed. It will be apparent to those of ordinary skill in the art that various modifications may be made to the present invention without departing from the spirit and scope thereof. The scope of the present invention should be defined by the appended claims and equivalents thereto.

What is claimed is:

1. A handheld portable solenoid activation device for operating doors of hopper railcars comprising:
    a housing configured to be held in one hand of the user in either door opening or door closing arrangements;
    a battery power source within the housing, wherein the battery power source is rechargeable;
    a pair of rigid leads extending from the housing and selectively coupled to the battery power source and configured to align and connect with the touch plate and ground plate of a railroad car door operating solenoid, wherein the housing provides isolation of the electrical components from the user.

2. The handheld portable solenoid activation device according to claim 1, further including an activator configured for one handed operation by the user, wherein activation when the leads are connecting the touch plate and ground plate will activate the solenoid for opening or closing of the railroad car door.

3. The handheld portable solenoid activation device according to claim 1, wherein the rigid leads are formed of ¼ diameter aluminum rods.

4. The handheld portable solenoid activation device according to claim 1, wherein the housing includes a lower portion formed as a pistol grip for one handed operation.

5. The handheld portable solenoid activation device according to claim 4, wherein the activator is a trigger button on the pistol grip.

6. The handheld portable solenoid activation device according to claim 1, further including a polarity toggle configured to switch the polarity of the leads.

7. The handheld portable solenoid activation device according to claim 6, wherein the polarity toggle includes an off position in which no power is sent to the leads.

8. The handheld portable solenoid activation device according to claim 7, wherein the polarity toggle is a switch.

9. The handheld portable solenoid activation device according to claim 1, further including a recharging plug in the housing for coupling a charging unit to the battery power source.

10. A handheld solenoid activation remote for a railroad car door comprising:
    A housing configured to be held in one hand of the user;
    A battery power source within the housing;
    A pair of leads extending from the housing and selectively coupled to the battery power source and configured to align and connect with the touch plate and ground plate of a railroad car door operating solenoid;
    An activator configured for one handed operation by the user, wherein activation when the leads are connecting the touch plate and ground plate will activate the solenoid for opening or closing of the railroad car door.

11. The handheld solenoid activation remote according to claim 10, wherein the leads are formed of rigid metal rods.

12. The handheld solenoid activation remote according to claim 11, wherein the leads are formed of ¼ diameter aluminum rods.

13. The handheld solenoid activation remote according to claim 10, wherein the housing includes a lower portion formed as a pistol grip for one handed operation.

14. The handheld solenoid activation remote according to claim 13, wherein the activator is a trigger button on the pistol grip.

15. The handheld solenoid activation remote according to claim 10, further including a polarity toggle configured to switch the polarity of the leads.

16. The handheld solenoid activation remote according to claim 15, wherein the polarity toggle includes an off position in which no power is sent to the leads.

17. The handheld solenoid activation remote according to claim 16, wherein the polarity toggle is a switch.

18. The handheld solenoid activation remote according to claim 10, further including a recharging plug in the housing for coupling a charging unit to the battery power source.

\* \* \* \* \*